L. T. SCHUBERTH.
MILK BOTTLE RECEPTACLE.
APPLICATION FILED NOV. 3, 1913.
1,120,853.
Patented Dec. 15, 1914.
3 SHEETS—SHEET 3.
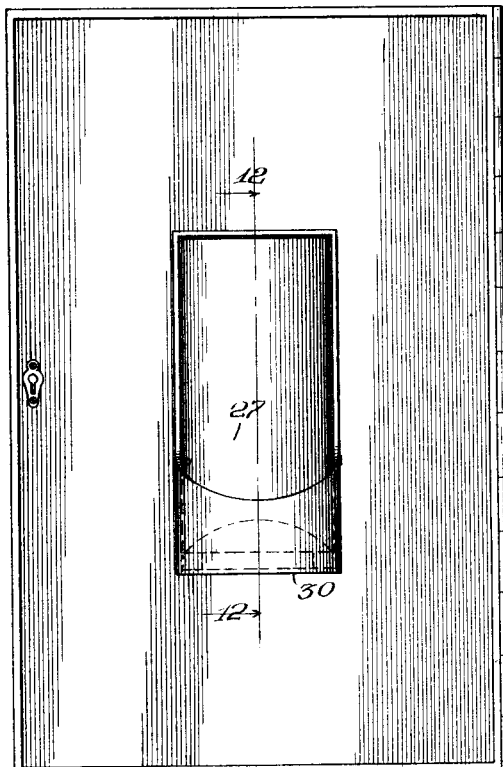
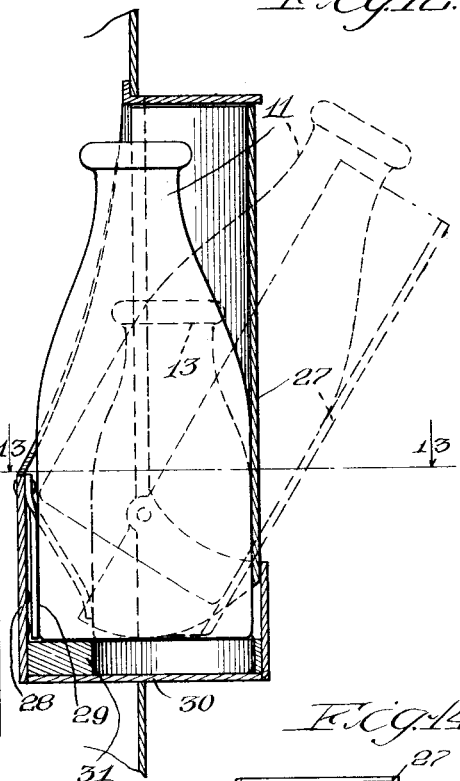
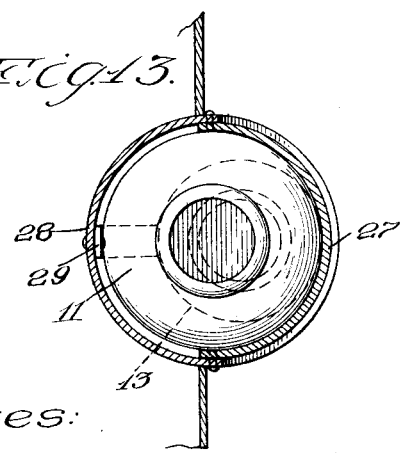
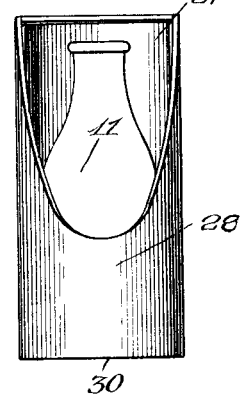
Witnesses:
R. L. Farrington
G. M. Neville
Inventor
Louis T. Schuberth
By Lotz & Scheible Attys.

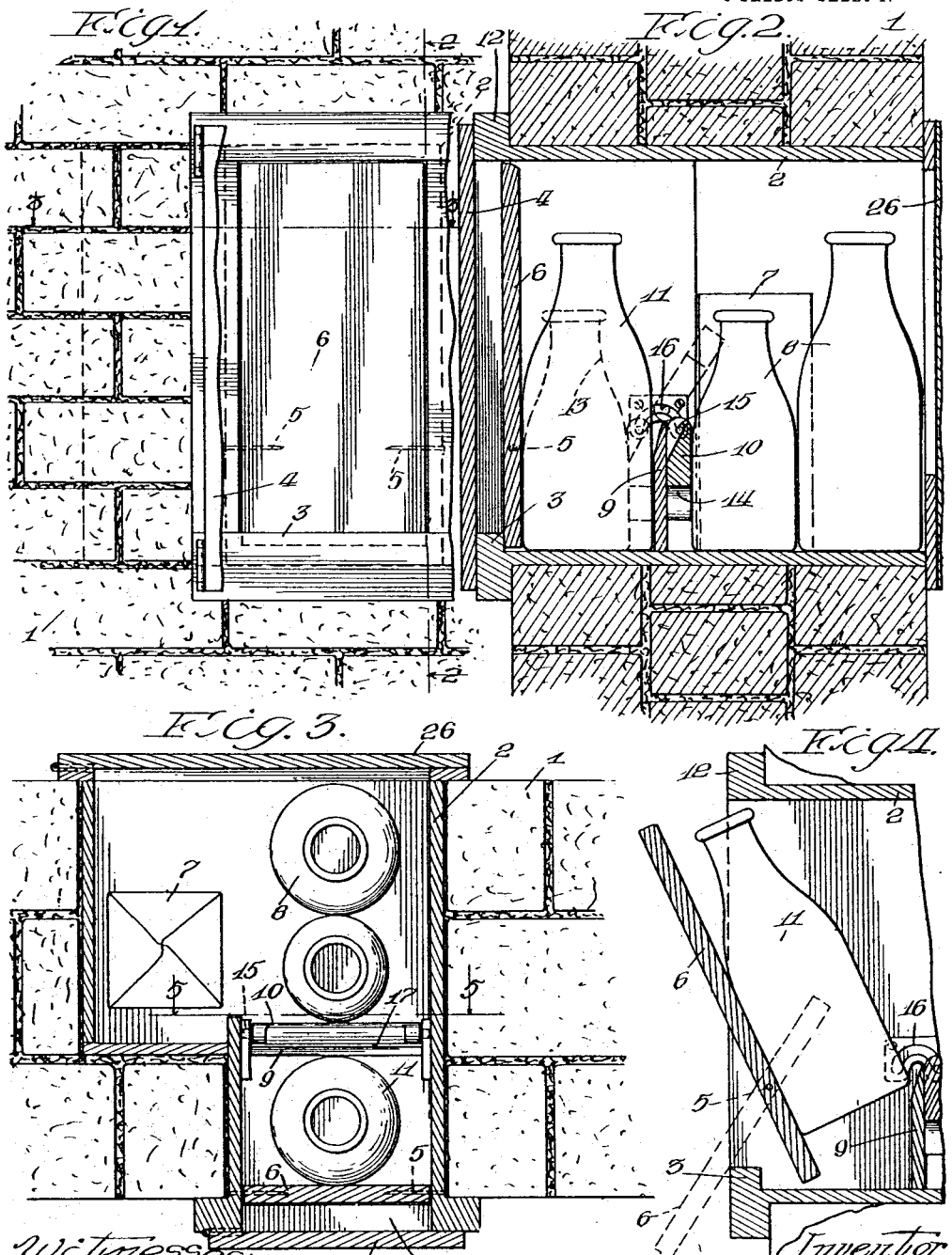

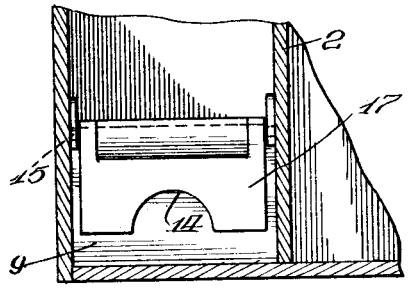
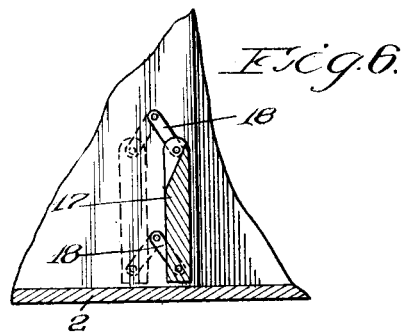
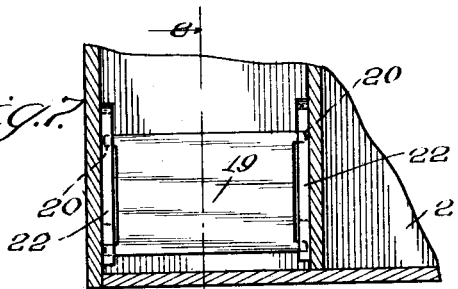
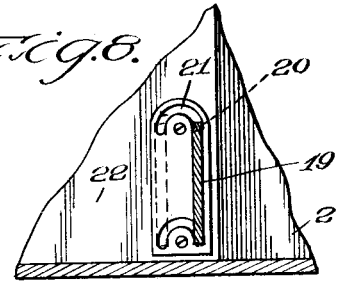
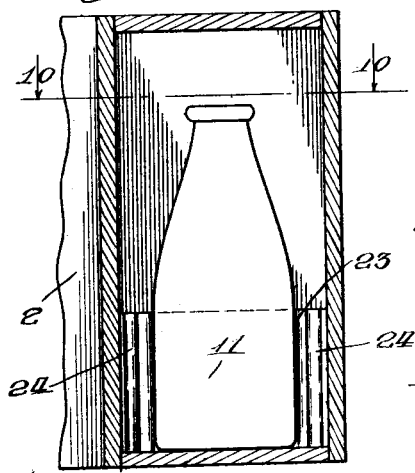
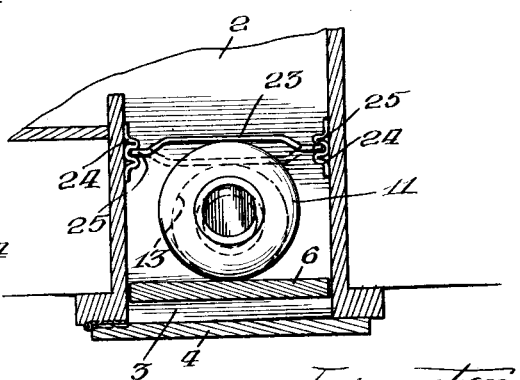

UNITED STATES PATENT OFFICE.

LOUIS T. SCHUBERTH, OF CHICAGO, ILLINOIS.

MILK-BOTTLE RECEPTACLE.

1,120,853.   Specification of Letters Patent.   Patented Dec. 15, 1914.

Application filed November 3, 1913. Serial No. 799,004.

*To all whom it may concern:*

Be it known that I, LOUIS T. SCHUBERTH, citizen of the United States, residing at Chicago, in the county of Cook and State of Illinois, have invented certain new and useful Improvements in Milk-Bottle Receptacles; and I do hereby declare the following to be a full, clear, and exact description of the invention, such as will enable others skilled in the art to which it appertains to make and use the same.

My invention relates to safety holders or cabinets for milk and other dairy products and more particularly to receptacles of this kind adapted to be built into the walls of buildings or lockers.

The prime object of my invention is to provide a receptacle adapted to permit milk and other articles of food to be inserted therein and adapted to be locked by the insertion of the final article, the latter being preferably in the form of a bottle.

Another object is to provide means for readily adjusting such a receptacle so that the locking may be effected by bottles varying in size.

My invention may be applied to receptacles varying considerably in shape and size with respect to the standard sizes of milk bottles, and the locking features thereof may also be carried out with substantially equal advantages in a number of different ways as described in the following specification and as shown in the accompanying drawings, in which—

Figure 1 is a fragmentary exterior view of a wall containing a food storage receptacle embodying my invention. Fig. 2 is a vertical section through the wall of Fig. 1 along the line 2—2. Fig. 3 is a horizontal section through Fig. 1 along the line 3—3. Fig. 4 is a fragmentary section similar to Fig. 2 showing the position of the door and partition members when a quart bottle of milk is being inserted. Fig. 5 is a detail section on the line 5—5 of Fig. 3. Fig. 6 is a fragmentary vertical section showing the movable partition member supported by links pivoted to the casing. Fig. 7 is a sectional view similar to Fig. 5 showing a modified form of construction of adjustable partition member. Fig. 8 is a vertical section through Fig. 7 along the line 8—8. Figs. 9 and 10 are vertical and plan sections respectively showing another arrangement of the adjustable partition member. Fig. 11 is an elevation of a milk-holding cabinet attached to the steel door of a locker. Fig. 12 is an enlarged vertical section through Fig. 11 along the line 12—12. Fig. 13 is a horizontal section through Fig. 12 along the line 13—13. Fig. 14 is a rear view of the milk cabinet of Fig. 11.

In applying my invention for general household use, I preferably build into the wall 1 of the building a cabinet 2 having a vertical opening 3 adjacent to the outer wall of the building, the said opening being preferably closed against the weather by a door 4 hinged to the outer framework of the cabinet. Pivotally mounted in the said opening 3 upon wire nails or other pivots 5 is a door adapted to close the said opening. The pivots 5 are preferably horizontally disposed at some distance below the center of the door, so that when the outer door 4 is opened, the inner door 6 may depend by gravity as shown in dotted lines in Fig. 4, thereby presenting a clear passage to the upper portion of the said opening and thus enabling packages of butter 7 or bottles of milk 8 to be inserted into the portion of the cabinet adjoining the inner wall of the building, or permitting bottles or other articles to be passed entirely through the said housing. Interposed between this inner portion of the cabinet and the portion equipped with the pivoted door 6 is a partition member consisting preferably of a main member 9 rigidly mounted parallel to the door 6 and the supplementary member 10 adapted to be disposed contiguous to the said member 9 either forwardly or rearwardly thereof. The main partition member 9 is so spaced with reference to the pivoted door 6, that the spacing therebetween will readily permit the insertion of a standard size quart milk bottle therebetween in a vertical position. When a bottle is thus introduced into the cabinet, it will be evident from Fig. 4 that the lower end of the bottle will force the lower portion of the door 6 outwardly until the door reaches its vertical closure position, as shown in Fig. 2. The bottle, 11 being substantially equal in diameter to the distance between the opposed faces of the door 6 and the partition 9, will then bear against the said door thereby preventing the latter from being moved on its pivots. Consequently, this door cannot be swung by an inward pressure upon the portion thereof below the said pivots, while the portion 12 of the exposed framework of the cabinet projects beyond the upper end of the door so as to prevent an insertion of a tool above the said door for grasping the bottle 11 or forcing the pivoted door open.

If the bottle placed in the outer compartment of the cabinet were of a smaller diameter, such as a standard pint milk bottle, the difference between the diameter of the latter and the aforesaid distance might permit a sufficient motion of the pivoted door to allow the insertion of fingers for grasping the bottle to raise the same and thereby permit its unauthorized withdrawal. To avoid this, the milkman planning to leave a pint bottle in the outer compartment swings the auxiliary partition member 10 from its normal position rearwardly of the main partition member 9 to the vertical position shown in dotted lines in Fig. 2, thereby contracting the said spacing between the opposed walls of the partition member and the pivoted door. Consequently, if a pint bottle 13 is then inserted into the outer compartment, as shown in dotted lines in Fig. 2, the same will effect the locking of the door. To facilitate the moving of the auxiliary partition member 10 from one to the other of its said positions, I provide the same at its lower end with a notched portion 14 for enabling this member to be easily manipulated with a finger and I may equip the said movable partition member with pins 15 engaging slots 16 in guides attached to the sides of the cabinet. Or, instead of effecting the desired change in spacing between the partition member and the pivoted door by a relative movement of one portion of the said member, the latter may be made of a single piece, as shown in Figs. 5, 6 and 9. In this case, I may form a single piece partition 17 secured to the side walls of the compartment by a pair of links 18, this being a construction easily applicable with a partition made of wood, or I may use a sheet metal partition 19 equipped at each end with a pair of prongs 20 projecting into slots 21 upon lateral guide plates 22 secured to the sides of the cabinet. Or, I may use a metal partition 23 slidably held by lateral guides 24, the body of the said partition being out of alinement with the ends 25 engaging the said guides, so that an inverting of the said partition (as shown in dotted lines in Fig. 10) will alter the spacing between the said partition and the pivoted door.

Where the appliance of my invention is to be used in a residence, I preferably arrange it to be built into a wall and preferably provide an enlarged storage compartment rearwardly of the said partition, to which storage compartment access may be had from within the building by opening a hinged door 26. Where my appliance is to be used only for storing a single bottle, as in the case of workmen's lockers, no enlarged storage compartment is needed. In this case, I omit the outer auxiliary door 4 and give the pivoted door 27 a substantially semi-cylindrical shape, while the inner wall 28 of the cabinet is likewise shaped substantially in the form of a semi-cylinder with the upper portion cut away, as shown in Fig. 14, to permit the withdrawal of the bottle locked in the cabinet. In this case, the adjustment of the distance between the partition and the door may be provided by making the partition 29 of spring metal having sufficient flexibility to be bent back close to the rear wall 28 of the cabinet, but normally tending to guide any bottle forwardly into close contact with the pivoted door. Then by equipping the bottom 30 of the cabinet with a crescent-shaped piece 31 corresponding substantially in horizontal section to the difference in transverse sections between standard size pint and quart bottles, I enable the curved wall of the said member 31 to act as a prolongation of the partition 29 to effect the locking of the door by a pint bottle when the latter is positioned as shown in dotted lines in Fig. 12.

While I have shown and described the locking features of my appliance as carried out in a number of different and substantially equally advantageous ways, I do not wish to be limited to the exact details herein disclosed, nor to the particular use mentioned for such an automatically locking storage cabinet, since the principles of my invention might be equally applicable to the storing of other articles, providing only that the one last inserted in each case is of a substantially standard size.

The total height of the housing is somewhat greater than the height of the largest bottle adapted to be received therein and the height of the partition wall coacting with a contained bottle to lock the door to the housing is such as to enable the bottle to be raised a sufficient distance within the housing to then permit the same to be turned on the upper end of the partition wall and removed over the latter. The height of the partition wall is regulated to permit removal of the bottle as above set forth and also bears a particular relation to the position of the pivotal axis of the door to said housing. It will be noted that the last-named pivotal axis is substantially on a level with the upper end of said partition wall and considerably lower than midway between the ends of the door. Thus the door need not be swung through a great arc in order to enable the bottle to be inserted into the housing, and furthermore, the inward swing of the lower end of the same is comparatively slight. Accordingly the inserted bottle cannot slide beyond the partition wall in letting it down, but the opening in the door may by turning the latter to a substantially horizontal position be opened wide enough to enable bottles to be inserted into the space back of the partition wall and then raised and the final bottle inserted in front of the partition wall. The movable member of the partition wall is preferably of the type shown in Fig. 2 and I have found that as the last bottle is inserted at an incline through the opening, it will strike the upper end of said movable member of the partition wall which is pivotally supported, and which ordinarily is free to turn on its pivot and will so turn by the frictional contact of the bottom of the bottle therewith, thus aiding the latter in finding its way into the space in front of said partition wall as the door closes provided, of course, that said movable member is at such time disposed behind the rigid member 9 of said wall.

I claim as my invention:

1. A milk bottle holder comprising a housing disposed in a wall and provided with openings disposed at opposite sides of the said wall, a partition within said housing intermediate of the said openings and of such height relative to that of the housing as to permit the passage of a bottle above the said partition from one of said openings to the other, and a door adapted to close one of said openings; the said door so disposed with respect to the partition that the insertion of a bottle therebetween will move the door to, and hold the same in, the position in which it closes the last named opening.

2. A milk bottle holder comprising a housing having a vertical opening at one end, a door for the said opening mounted below its center upon horizontal pivots, and a partition member within the said housing spaced from the said door by a distance substantially equal to the diameter of a milk bottle, the said door and partition member coacting when the bottle is slid into the housing through the opening adjacent to the upper portion of the door to guide the lower end of the said bottle into the space between the lower end of the door and the partition member, the said end of the bottle when thus housed abutting against the lower end of the door to lock the latter, and means for adjusting the said partition member to vary the said distance so that the locking of the door may be effected by bottles of different diameters.

3. A milk bottle holder comprising a housing having a vertical opening at one end, a door for the said opening mounted below its center upon horizontal pivots, and a partition member within the said housing spaced from the said door by a distance substantially equal to the diameter of a milk bottle, the said door and partition member coacting when the bottle is slid into the housing through the opening adjacent to the upper portion of the door to guide the lower end of the said bottle into the space between the lower end of the door and the partition member, the said end of the bottle when thus housed abutting against the lower end of the door to lock the latter; the said partition member comprising a main member and an auxiliary member movable with respect thereto, the latter adapted to be interposed between the main member and the door to decrease the said distance to enable the said locking to be effected by a bottle of smaller diameter.

4. A milk bottle holder comprising a housing having a vertical opening at one end, a door for the said opening mounted below its center upon horizontal pivots, and a partition member within the said housing substantially parallel to the said door and spaced therefrom by a distance substantially equal to the diameter of a milk bottle, the said door and partition member coacting when the bottle is slid into the housing through the opening adjacent to the upper portion of the door to guide the lower end of the said bottle into the space between the lower end of the door and the partition member, the said end of the bottle when thus housed abutting against the lower end of the door to lock the latter, the said partition member being of such height with respect to the housing as to permit the insertion of bottles through the said opening and above the partition into the portion of the housing beyond the said partition.

5. A milk bottle holder comprising a housing open at one end and equipped with a door adapted to swing on a pivotal axis disposed below the middle and above the lower end thereof and adapted to be swung outwardly at its upper end to permit the insertion of a bottle into the housing, means disposed in the housing opposite the lower end of said housing and including a part rigid with the housing and a manually movable member, said rigid part constituting a stop to limit the movement of said movable member in one direction, said movable member adapted when disposed in position nearest the door, to coact with a bottle of minimum diameter adapted to be inserted in said housing to afford a stop to prevent inward movement of the lower end portion of the door.

In testimony whereof I have signed my name in presence of two subscribing witnesses.

LOUIS T. SCHUBERTH.

Witnesses:
ALBERT SCHEIBLE,
M. M. BOYLE.

Copies of this patent may be obtained for five cents each, by addressing the "Commissioner of Patents, Washington, D. C."